May 22, 1928.

J. E. RAYBURN

FENCE BARB

Filed Nov. 25, 1925

1,670,481

James E. Rayburn, Inventor

By Richard B. Owen

Attorney

Witnesses

Patented May 22, 1928.

1,670,481

UNITED STATES PATENT OFFICE.

JAMES EDWARD RAYBURN, OF RUPPERTOWN, TENNESSEE.

FENCE BARB.

Application filed November 25, 1925. Serial No. 71,386.

This invention relates to attachments for fence structures and the like and has for its prime object to provide a detachable barb member adapted to be mounted on the strands of a fence to prevent the escape therethrough of cattle and the like.

A further object of the invention is the provision of an attachment of the above character formed so as to be easily mounted upon a fence and readily detached therefrom when desirable.

A still further object of the invention is the provision of a barb attachment of the above kind provided with pointed projections adapted to prick the cattle and discourge the attempted escape thereof through the fence.

A further object of the invention is the provision of an attachment of the above character of durable and efficient construction designed to be manufactured at a comparatively low cost.

Other objects and advantages of the invention will become apparent as the description progresses.

Figure 1:
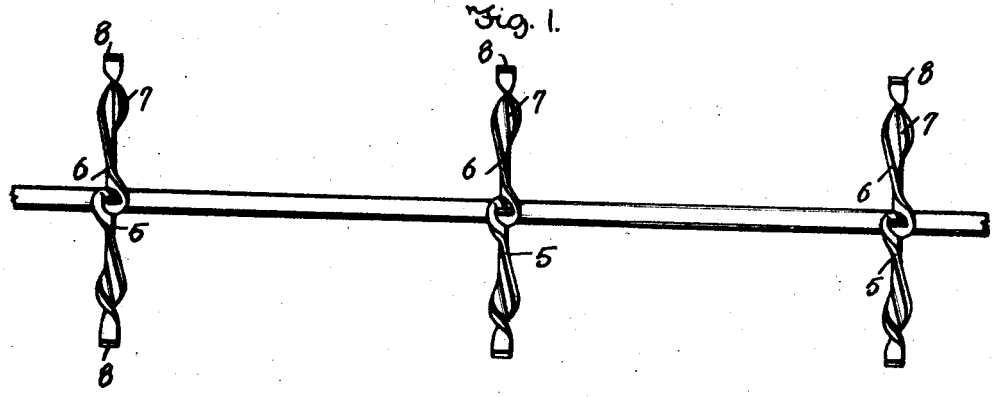
Figure 2:
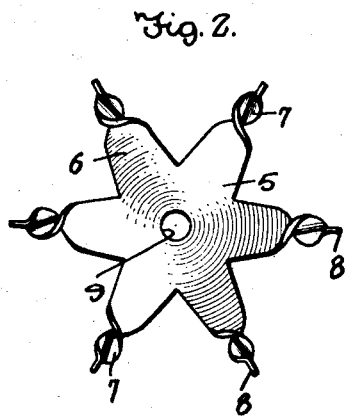
Figure 3:
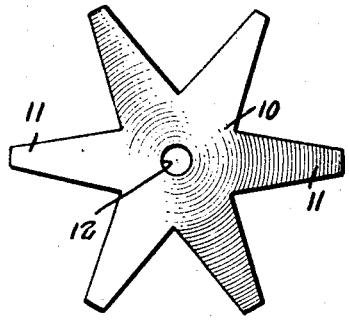

In the accompanying drawing forming a part of this specification and in which like numerals are employed to designate corresponding parts throughout the same:

Figure 1 is a side elevation of a wire strand of a fence showing my attachment mounted in position thereon, Figure 2 is a side elevation of the attachment comprising my invention, and Figure 3 is a similar view of a modified form of the attachment.

As is well known in the art, the common forms of fence structures employed on farms and pastures embody a plurality of horizontally extending wire strands strung on posts and vertical strands adapted to retain the horizontal longitudinal strands in suitable spaced relation. This type of fence is very widely used as it is suitable for all purposes and may be erected at a reasonable cost. It is, of course, appreciated that fence structures embodying sharply pointed barbs, incorporated at the time of manufacture, are also widely used, but the excessive cost of this type of fence prohibits its use in large quantities, as a substantial portion of the enclosure may not necessitate the use of this type of structure. With this in mind, my invention relates to a barb attachment which may be conveniently mounted on such portions of the enclosing fence as is employed to prevent the escape of cattle or swine. Thus the farmer may always maintain a sufficient stock of fence wire on hand and adapt the same for any desired use, the barb attachment being mounted on the fence wires where the fence encloses a pasture field while the unbarbed fence wires may be employed on fences to enclose the crop fields.

Referring now with particularity to the drawing the numeral 5 generally indicates the barb member, the body thereof being substantially star shaped. With particular reference to Figures 1 and 2, wherein is disclosed the preferred embodiment of my invention, it will be noted that the body 5 is provided with a plurality of radially projecting prongs 6 having their outermost portions twisted as at 7 and the outer extremities preferably tapered to provide spurs 8 having comparatively sharp transverse edges. The body is provided centrally with a circular opening 9 adapting the barbs for application to the fence wire. The diameter of the opening 9 is such that the barb will snugly fit upon the wire strand so that the attachment may be forced on the strand and will be retained firmly in position. If desirable, however, the fence strand may be twisted about the attachment so as to prevent displacement of the same and retain these members in suitable spaced relation.

Referring now more particularly to Figure 3, wherein is shown a modified form of the attachment, the body 10 is formed from a flat metallic plate and provided with a plurality of radially extending tapered projecting prongs 11, these prongs being preferably arranged in spaced relation and being preferably six in number. The center of the body 10 is provided with a suitable aperture 12 adapting the barb for connection with the fence strands and is mounted on the strands in a similar manner to that of the preferred embodiment previously described. The present form, differs essentially in that the prongs 11 are of straight formation and will, therefore, provide a substantially cheaper device. It will be noted, that the tapered extremities of the prongs 11 in the modified form of barb structure will lie in a vertical plane. The projections on the preferred type, on the other hand, may extend transversely as shown to advantage in Figures 1 and 2, thus providing a structure considered of greater efficiency.

It is apparent that the present device provides a simple and efficient detachable barb member adapted to be replaceably mounted on farm fences and similar structures, designed to be cheaply manufactured and efficient for the purpose of warding off cattle, hogs and the like so as to discourge attempts by the animals to escape through the fence or damaging the same.

It is to be understood that the forms of my invention herewith shown and described are to be taken as the preferred example of the same, and that various changes as to the size and shape may be resorted to without departing from the spirit of the invention or the scope of the subjoined claim.

Having thus described my invention, I claim:

A barb attachment for wire fences comprising a body having a centrally located opening therein to accommodate a strand of a wire fence upon which strand the attachment is to be supported, the said body having a plurality of radially extending, tapered prongs, the outer extremities of the prongs being twisted to provide transversely extending spurs having comparatively sharp transverse outer edges substantially parallel to the axis of the opening in the body.

In testimony whereof I affix my signature.

JAMES EDWARD RAYBURN.